United States Patent Office 3,076,043
Patented Jan. 29, 1963

3,076,043
METHOD OF RECOVERING HIGH PURITY CHLOROFORM AND CARBON TETRACHLORIDE
Frederick Chris Dehn, New Martinsville, W. Va., assignor, by mesne assignments, to Pittsburgh Plate Glass Company
No Drawing. Filed Nov. 26, 1958, Ser. No. 776,423
4 Claims. (Cl. 260—664)

The present invention relates to the recovery of high purity chloroform and carbon tetrachloride from mixtures of these solvents containing chlorinated aliphatic hydrocarbon impurities.

The recovery by distillation technique of high purity carbon tetachloride and chloroform from mixtures of these two compounds or from impure solutions of either is a particularly difficult problem when these mixtures or solutions contain as impurities chlorinated aliphatic hydrocarbons containing two carbon atoms. Chlorinated aliphatic hydrocarbons having two carbon atoms therein such as dichloroethylenes, trichloroethylenes, dichloroethanes, and the like, either alone or as azeotropes of carbon tetrachloride or chloroform, boil at temperatures close to the boiling point of carbon tetrachloride or chloroform. The boiling point of the contaminating compounds or of azeotropes that they may form with either the carbon tetrachloride or the chloroform thus renders separation of high purity chloroform or carbon tetrachloride from mixtures thereof, or from solutions of predominantly chloroform or predominantly carbon tetrachloride extremely difficult and at times virtually impossible.

A novel procedure has been found according to the present invention that permits mixtures of carbon tetrachloride and chloroform which are contaminated with chlorinated aliphatic hydrocarbons to be separated by distillation techniques to provide high purity carbon tetrachloride and high purity chloroform. It has been found further that a carbon tetrachloride solution containing aliphatic $C_2$ hydrocarbons as contaminants therein may be subjected to a distillation and a high purity carbon tetrachloride obtained therefrom despite the presence of these contaminating impurities in the crude solution. In a still further embodiment of the present invention, it has also been found that high purity chloroform may be obtained from chloroform solutions containing as contaminating impurities chlorinated aliphatic $C_2$ hydrocarbons by recourse to distillation techniques.

The process of this invention is particularly effective when utilized in conjunction with processes involving the oxychlorination of methane. Thus, as described in U.S. Patent 2,752,401 granted June 26, 1956, during the oxychlorination of methane organic product gas streams are produced which contain in varying quantities methyl chloride, methylene chloride, chloroform and carbon tetrachloride. In addition to the organic product compounds recited, various quantities of chlorinated $C_2$ hydrocarbons are also produced. The concentration of chlorinated $C_2$ impurities contained in mixtures of this type is generally below 5 percent by weight of the mixture and usually is of the order of 0.5 to 2 percent by weight of the mixture. The presence of chlorinated aliphatic $C_2$ hydrocarbon impurities in these concentrations however renders the recovery of the individual chlorinated methane components of the product gas stream in a state of high purity extremely difficult and the overall process economically unattractive.

According to this invention product gas streams containing chloroform and carbon tetrachloride mixtures having chlorinated aliphatic hydrocarbons containing two carbon atoms as impurities therein may be effectively separated by simple distillation techniques by employing a selective, novel sequence of distillation and chlorination steps. Thus, in separating a chloroform-carbon tetrachloride mixture having chlorinated aliphatic $C_2$ hydrocarbons as impurities therein, the mixture is chlorinated in a first zone. In conducting this chlorination, low boiling $C_2$ aliphatic hydrocarbons such as dichloroethylene, trichloroethylene, and the like are converted to higher boiling chlorinated aliphatic hydrocarbons such as hexachloroethane, pentachloroethane, and the like. The resulting chloroform-carbon tetrachloride mixture is then subjected to a distillation procedure regulated in temperature and pressure to provide an overhead containing chloroform and a bottoms containing carbon tetrachloride and the high boiling $C_2$ aliphatic chlorinated hydrocarbons formed by the chlorination step. The carbon tetrachloride bottoms containing chlorinated aliphatic $C_2$ impurities is then subjected to a second distillation at temperatures and pressures sufficient to provide as an overhead high purity carbon tetrachloride free or substantially free of aliphatic chlorinated $C_2$ impurities.

During a chlorination-distillation procedure as hereinabove described, certain quantities of chloroform are converted to carbon tetrachloride. This conversion of chloroform to carbon tetrachloride ordinarily has no detrimental effect on the overall efficiency of the process since in such a system both products are desirable. When the contaminating chlorinated aliphatic $C_2$ hydrocarbons are unsaturated compounds, chlorination of chloroform in the chlorination step is at a minimum since the unsaturated $C_2$ impurities have a greater affinity for the chlorine present in the chlorination zone than does the chloroform. However, when a mixture of carbon tetrachloride or chloroform is to be separated by distillation techniques, and contains as an impurity a chlorinated saturated $C_2$ impurity such as 1,2-dichloroethane, reduction in the quantities of chloroform obtainable may be experienced due to the tendency of the chloroform to chlorinate more readily than the saturated $C_2$ chlorinated hydrocarbon impurity.

Thus, in chloroform-carbon tetrachloride mixtures, containing therein a saturated, chlorinated, aliphatic, $C_2$ impurity, a special sequence of distillations and chlorinations is undertaken to insure maximum recovery of both high purity chloroform and high purity carbon tetrachloride. In chlorinating a carbon tetrachloride-chloroform mixture containing as impurities therein chlorinated, aliphatic, saturated and unsaturated hydrocarbons containing two carbon atoms, therefore, the mixture is first passed into a first chlorination zone and chlorinated therein. In this zone sufficient elemental chlorine is provided to adequately insure chlorination of all unsaturated $C_2$ containing impurities. The resulting mixture from this first chlorination zone is then passed to a first distillation column which is operated at temperatures and pressures sufficient to provide a chloroform overhead and a carbon tetrachloride-$C_2$ impurities containing bottoms. The bottoms from this first distillation is then passed into a second chlorination zone and chlorinated therein. The resulting mixture from this second chlorination zone is then passed to a second distillation column operated at a temperature and pressure sufficient to provide an overhead of essentially high purity carbon tetrachloride and a bottoms containing chlorinated aliphatic $C_2$ compounds. Operation in this manner provides for complete removal or essentially complete removal of all chlorinated $C_2$ impurities contained in the original chloroform-carbon tetrachloride mixture, while at the same time permitting the recovery of the maximum amounts of carbon tetrachloride and chloroform as high purity carbon tetrachloride and chloroform.

In a preferred embodiment of the instant invention chlorination of the $C_2$ impurities is accomplished by recourse to photo-chemical techniques. Thus, the carbon tetrachloride-chloroform mixtures containing $C_2$ impurities are subjected to the action of gaseous, elemental chlorine in the presence of actinic irradiation. Chlorinations of this type have been found particularly effective. Other types of chlorinations may also be employed if desired. Thus, utilization of a straight thermal chlorination of the contaminating impurities contained in the solvent mixture by contacting them with gaseous, elemental chlorine in the presence of sufficient heat to produce chlorination is permissible. Similarly, if desired, a catalytic type of chlorination such as contacting the impurities containing solvent with gaseous, elemental chlorine in the presence of a metal halide such as ferric chloride, may also be employed.

The quantity of chlorine used in the chlorination steps herein described is widely variable and depends to a great extent on the nature of the $C_2$ impurities and the amount of contaminants which may be tolerated in the products to be recovered from the crude mixtures. Generally the stoichiometric quantity of chlorine necessary to accomplish complete addition of chlorine to the double bonds of contaminating unsaturated compounds present, or to convert any low boiling contaminating chlorinated $C_2$ saturated compounds present by substitution to high boiling chlorinated saturates which will boil at temperatures substantially above the desired solvent products, or to accomplish both of these ends when both unsaturates and saturates are present as contaminants is supplied to the chlorination step.

Preferably an excess of the theoretical or stoichiometric amount of chlorine necessary to accomplish the above mentioned results are employed. Quantities which range from the stoichiometric requirement to values of 10 percent to 500 percent above the stoichiometric requirement or even higher may be readily employed. With chlorinated, saturated, aliphatic impurities such as 1,2-dichloroethane present it is advisable to use a considerable excess of chlorine for example, 200 percent to 900 percent more than the stoichiometric requirement. Should less than substantially complete removal of chlorinated $C_2$ impurities be permissible in the final product solvents, then of course less than stoichiometric quantities of chlorine may be utilized in the chlorination steps, the exact quantity being dependent upon the amounts of impurities present and the tolerance of impurities permitted in the chloroform and carbon tetrachloride products.

Photochlorinations undertaken in accordance with this invention may be conducted in any suitable container or reactor which will permit sufficient exposure of the treated mixture to the influence of the actinic light employed to accomplish the chlorination of the impurities. Thus for example, large flasks, elongated tubes and the like constructed of glass through which light may be passed may be conveniently employed. Similarly, if desired, tubes or reactors constructed of metal, ceramics, or other structural material into which lights may be inserted and operated to provide actinic radiation for mixtures contained within them or passed through them may also be employed. If desired, photochlorinators utilized in accordance with this invention may also be provided with suitable agitation or stirring devices, spraying mechanisms, and the like, to provide the maximum amount of contact and dispersion of the treated mixture to the light rays.

Light employed in accordance with this embodiment of the invention may comprise infrared lamps, ultra violet lights, or any other suitable form of actinic radiation such as tungsten filament lamps. Generally, sources which provide irradiation having wave lengths between 130 and 7700 Angstroms are found to be effective in producing the desired effects. The wattage rating of the individual lamps or multiplicity of lamps utilized for a given reactor is subject to wide variation and will depend upon the quantities of material treated, the size of the reactor, and other considerations of this nature. Temperatures are variable but generally range between $-20°$ C. and $+80°$ C.

Similarly, in conducting thermal or catalytic chlorinations of the $C_2$ impurities recourse may be had to varied reactors or containers and techniques. Thus, metal, ceramic or glass containers may be employed as well as vessels constructed of combinations of structural materials such as ceramic lined steel or other metal fabricated vessel. The reactors may be tanks, tubes or any other structural configuration that will lend itself to the reaction taking place therein. If desired, catalytic reaction may be accomplished in fixed beds, but use may also be made of fluid bed and suspension techniques.

Temperatures utilized in the thermal or catalytic chlorination of $C_2$ impurities contained in a solvent mixture as hereinbefore described are subject to wide variations. Thus, for example, temperatures between 150° C. and 500° C. may be employed with satisfactory results. The practical limits of temperatures being that they are high enough to institute a chlorination reaction between the $C_2$ impurities and the added chlorine and low enough not to decompose the product.

Distillation columns employed may be constructed of glass, steel, ceramic materials or any other suitable structural material. The columns may contain plates or may be packed columns, or if desired may not contain any packing. The particular type column employed will vary widely and is of no particular consequence so long as it is capable of handling the distillation.

The temperatures employed in distilling the various mixtures employed in accordance with this invention will vary depending upon the mixture treated within an individual column. Thus, for example, in operating a column in which chloroform and carbon tetrachloride fractions are to be separated, the column will be operated at a temperature and pressure sufficient to permit the chloroform to be removed as overhead from the top of the column, while leaving behind a bottoms of carbon tetrachloride and chlorinated aliphatic $C_2$ containing hydrocarbons. Thus, for example, in separating chloroform and carbon tetrachloride under essentially atmospheric pressure conditions a temperature at the top of the column below 70° C. would be desirable in order to prevent any carbon tetrachloride from being removed from the column. Similarly, in separating a mixture of carbon tetrachloride from contaminating $C_2$ impurities, boiling above 80° C., the column would be operated somewhere between the boiling point of carbon tetrachloride, e.g., 76.8° C. and the 80° C. limit presented by the impurities to provide a carbon tetrachloride overhead.

In the operation of the chlorination distillation procedures hereinbefore described with mixtures which contain in addition to chlorinated aliphatic $C_2$ unsaturates, also chlorinated aliphatic $C_2$ saturates, preferably two separate and distinct chlorination zones are maintained. The provision of two chlorination zones however is not necessary to effectively conduct the process as described since, if desired, the material or mixture from a first chlorination zone may be passed directly to a first distillation column, the chloroform removed as overhead, and the carbon tetrachloride-$C_2$ chlorinated hydrocarbon mixture remaining recycled back to the first chlorination zone and again chlorinated before being passed to the final distillation zone.

In the oxychlorination of methane as described in U.S. Patent 2,752,401 the mixture of chlorinated methanes obtained contains methyl chloride, methylene chloride, chloroform and carbon tetrachloride in varying quantities, depending upon operating conditions. Methyl chloride being extremely low boiling presents no particular problems from the standpoint of removing it from the product stream. However, methylene chloride, chloroform, and carbon tetrachloride due to the presence of contaminating quantities of chlorinated aliphatic $C_2$ containing hydrocarbons, both saturates and unsaturates, are extremely difficult to separate each from the other in a high degree of purity. Thus in separating a mixture containing methylene chloride, chloroform, and carbon tetrachloride which contains chlorinated aliphatic, saturates and unsaturates, containing two carbon atoms as impurities, it is necessary to pass the entire mixture to a first zone wherein chlorination of the unsaturated impurities is undertaken. The resulting mixture is then subjected to a first distillation conducted at a temperature and pressure sufficient to provide a methylene chloride distillate and a chloroform-carbon tetrachloride bottoms, the $C_2$ impurities remaining in the bottoms. The carbon tetrachloride-chloroform bottoms is then subjected to a distillation conducted at a temperature and pressure sufficient to provide a chloroform distillate and a carbon tetrachloride bottoms containing the $C_2$ impurities. The bottoms from this distillation is then passed to a second chlorination zone or recycled to the chlorination zone originally employed. On completion of a chlorination of this material the resulting mixture is then subjected to a distillation conducted at a temperature and pressure sufficient to provide a carbon tetrachloride distillate and a bottoms containing chlorinated $C_2$ impurities. Operating with a series of distillation and chlorination steps as herein described provides for the separation and recovery of high purity methylene chloride, chloroform and carbon tetrachloride from mixtures containing these compounds in admixtures with contaminating aliphatic chlorinated $C_2$ impurities.

For a more complete understanding of the present invention reference is made to the following examples which are illustrative of some of the methods by which the present invention may be carried out.

EXAMPLE I

A 500 milliliter, 3-necked glass flask is utilized as a photochlorinator. The flask is fitted with a glass chlorine inlet tube, a stirrer and a cold water condenser. Water and caustic solution traps are attached to the condenser outlet for the absorption of HCl and unreacted chlorine. The flask is partially immersed in a water bath maintained at a temperature of between 25° C. and 30° C. The flask is charged with 300 grams of a mixture containing 73 percent by weight chloroform, 26 percent by weight carbon tetrachloride and varying weight percents of 1,2-dichloroethylene and trichloroethylene. Gaseous chlorine is metered into the flask at a rate of flow of from 0.03 to 0.04 liter, at standard conditions of temperature and pressure, per minute for a period of time sufficient to introduce the desired quantity of chlorine to the flask. After the desired quantity of chlorine is added the chlorine flow is stopped. A 275 watt tungsten filament Westinghouse sunlamp is placed one inch from the flask wall. The lamp is turned on and the contents of the flask stirred. The irradiation and stirring are continued for 10 minutes after which time the lamp is removed and the stirring stopped. The products in the flask are analyzed utilizing recognized infrared spectrographic methods. The results of the runs and the amounts of contaminating $C_2$ impurities in the mixtures before and after treatment are shown below in Table I.

The chlorinated mixture is fed to distillation column to recover the chloroform and carbon tetrachloride therefrom.

The column is constructed entirely of glass. The tube of the column is one inch in inside diameter and contains a total of 5 feet of one eighth inch glass helices as packing. The packing support is a combination of Vigereaux tips projecting about one and one-half inches into the tube and holding up Raschig rings on top of which the packing rests. The head is constructed of glass also and consists of a wafer jacketed condenser, a swinging funnel distillate collector magnetically controlled by means of a flexopulse timer.

The column is held at total reflux for three hours after the proper boil-up of about 1200 milliliters per hour is obtained so that equilibrium conditions are established. The distillation is started moving forward at a reflux ratio of thirty to one. This reflux ratio is maintained until steady temperature conditions are observed in the column which insures relatively pure $CHCl_3$ as the overhead product. The reflux ratio is then changed to fifteen to one. This new reflux ratio is held until the column temperature changes indicating that the chloroform is nearly exhausted and then is changed back to thirty to one to insure as little contamination as possible. As soon as the last traces of chloroform are recovered the column is then operated in a similar fashion to remove carbon tetrachloride.

Carbon tetrachloride and chloroform substantially free of contaminating impurities are obtained operating in this manner.

The mixture obtained after the photochlorination is subjected to distillation in laboratory scale distillation columns and chloroform and carbon tetrachloride are recovered substantially free of contaminaing $C_2$ impurities.

EXAMPLE II

Utilizing the same conditions and apparatus as employed in Example I, 300 grams of a mixture of 73 percent chloroform, 25.26 percent carbon tetrachloride, 0.116 percent 1,2-dichloroethylene, 0.752 percent trichloroethylene, and 0.875 percent 1,2-dichloroethane (all percentages being by weight) is subjected to photochlorination in the presence of varying amounts of gaseous chlorine to remove the $C_2$ impurities in the mixture. Table II, below, indicates the amount of removal of these impurities.

TABLE II

| Run | Percent of theoretical $Cl_2$ fed | Contaminants in mixture after chlorination (weight percent) | | $CH_2ClCH_2Cl$ |
| --- | --- | --- | --- | --- |
| | | CHCl-CHCl | CHCl-CCl$_2$ | |
| 4 | 90 | 0.00 | 0.07 | 0.715 |
| 5 | 135 | 0.00 | 0.00 | 0.640 |
| 6 | 180 | 0.00 | 0.00 | 0.390 |

The mixture obtained after the photochlorination is subjected to distillation as in Example I and chloroform substantially free of contaminating impurities obtained.

TABLE I

*Photochlorination of Chloroform-Carbon Tetrachloride Mixtures Containing Cis-1,2-Dichloroethylene and Trichloroethylene*

| Run | Percent excess $Cl_2$ fed [1] | Synthetic mixture (weight percent contaminants) | | Synthetic mixture after chlorination (weight percent contaminants) | |
| --- | --- | --- | --- | --- | --- |
| | | CHCl=CHCl | CHCl=CCl$_2$ | CHCl=CHCl | CHCl=CCl$_2$ |
| 1 | 145 | 0.13 | 0.74 | 0.0 | 0.00 |
| 2 | 100 | 0.16 | 0.81 | 0.0 | 0.05 |
| 3 | 45 | 0.16 | 0.81 | 0.0 | 0.30 |

[1] Quantity in excess of that required for addition to double bonds.

EXAMPLE III

Utilizing the apparatus and conditions of Example I, 300 grams of a mixture of 73 percent chloroform, 26.76 percent carbon tetrachloride, 0.245 percent dichloroethane (all percentages being by weight) is subjected to photochlorination in the presence of varying amounts of gaseous chlorine in an attempt to completely remove the dichloroethane content thereof. The results appear below in Table III.

TABLE III

*Photochlorination of Chloroform-Carbon Tetrachloride Mixtures Containing 0.245 Percent 1,2-Dichloroethane (Chlorine Added Prior to Irradiation)*

| Run | Percent excess $Cl_2$ | Weight percent dichloroethane after chlorination |
| --- | --- | --- |
| 6 | 900 | 0.081 |
| 7 | 1,400 | 0.050 |

The photochlorinated mixture is distilled as described in Example I and high purity chloroform and carbon tetrachloride obtained.

EXAMPLE IV

Utilizing the apparatus of Example I, and photochlorinating conditions employed therein, 300 grams of a mixture of 1,2-dichloroethane in carbon tetrachloride is subjected to photochlorination in the presence of varying amounts of gaseous chlorine. Varying amounts of 1,2-dichloroethane are employed in the carbon tetrachloride. The results of these runs are shown below in Table IV.

TABLE IV

*Photochlorination of 1,2-Dichloroethane in Carbon Tetrachloride*

| Run | Percent excess $Cl_2$ | Weight percent dichloroethane in $CCl_4$ | Weight percent dichloroethane in $CCl_4$ after chlorination |
| --- | --- | --- | --- |
| 8 | 100 | 0.6 | 0.0 |
| 9 | 10 | 0.645 | 0.081 |
| 10 | 25 | 0.645 | 0.010 |

The photochlorinated mixture is distilled as described in Example I and an essentially dichloroethane free carbon tetrachloride is obtained.

As will be readily apparent from an examination of the above examples, the utilization of photochlorination on mixtures of carbon tetrachloride and chloroform which contain chlorinated $C_2$ unsaturated aliphatics as impurities has a marked effect on the reduction of these contaminated impurities. In all cases where the unsaturated aliphatic $C_2$ content is shown as reduced or eliminated entirely, the spectrographic analysis of the resulting mixture shows the unsaturated contaminant to have been chlorinated to pentachloroethane, an extremely high boiler. Similarly, in those runs where 1,2-dichloroethane was present as an impurity it was eliminated from the solution or its percentage drastically reduced. Spectrographic analysis showed that the 1,2-dichloroethane impurities in the mixtures were converted to 1,1,2-trichloroethane, an extremely high boiler.

As will be understood the removal of $C_2$ impurities from a carbon tetrachloride containing solvent mixture by chlorination and distillation may readily be coupled with a chlorination of all chlorinated methanes below carbon tetrachloride to thereby produce an essentially pure carbon tetrachloride product. Thus, by feeding a large stoichiometric excess of chlorine to the chlorination zones employed in chlorinating $C_2$ impurities any chloroform, methylene chloride or methyl chloride may be readily chlorinated to carbon tetrachloride.

In addition, if desired, recourse may be had to fractional distillation techniques in conjunction with the chlorination procedures herein disclosed. Thus, if desired, a chlorination of the contaminating aliphatic $C_2$ impurities, both saturates and unsaturates, may be followed by a fractional distillation procedure wherein cuts of the various products of the mixture treated may be taken in a single operation. The procedure followed with respect to chlorination and distillation steps will, of course, be dependent upon the nature of the contaminating impurities present as hereinbefore described.

While the invention has been described with reference to certain specific examples and operating conditions, it is, of course, not intended that the invention be so limited except insofar as appears in the accompanying claims.

I claim:

1. The method of recovering high purity chloroform and high purity carbon tetrachloride from mixtures of chloroform and carbon tetrachloride containing contaminating quantities of chlorinated $C_2$ aliphatic saturated and unsaturated hydrocarbons comprising chlorinating said mixture to convert the chlorinated aliphatic, unsaturated $C_2$ hydrocarbons to chlorinated aliphatic, saturated $C_2$ hydrocarbons distilling the resultant mixture at a temperature and pressure sufficient to provide a chloroform overhead and a carbon tetrachloride bottoms containing the chlorinated aliphatic saturated $C_2$ hydrocarbons, chlorinating said carbon tetrachloride bottoms to convert all low boiling chlorinated aliphatic, saturated, $C_2$ hydrocarbons to higher chlorinated aliphatic, saturated $C_2$ hydrocarbons distilling the resulting mixture at a temperature and pressure sufficient to provide an overhead of substantially pure carbon tetrachloride and a bottoms containing high boiling, chlorinated, aliphatic, saturated, $C_2$ hydrocarbons.

2. A method of recovering high purity methylene chloride, chloroform and carbon tetrachloride from a mixture of methylene chloride, chloroform and carbon tetrachloride containing contaminating quantities of chlorinated aliphatic, saturated and unsaturated $C_2$ hydrocarbons comprising chlorinating said mixture for a period of time sufficient to convert all chlorinated, unsaturated $C_2$ hydrocarbons to chlorinated saturated $C_2$ hydrocarbons, distilling the resulting mixture at a temperature and pressure sufficient to provide an overhead of high purity methylene chloride and a bottoms of chloroform and carbon tetrachloride containing chlorinated, aliphatic, saturated $C_2$ hydrocarbons, distilling said bottoms at a temperature and pressure sufficient to provide an overhead of high purity chloroform and a bottoms of carbon tetrachloride containing chlorinated aliphatic, saturated $C_2$ hydrocarbons, chlorinating said carbon tetrachloride containing chlorinated, aliphatic saturated $C_2$ hydrocarbons to convert all low boiling chlorinated aliphatic, saturated $C_2$ hydrocarbons to higher boiling chlorinated aliphatic, saturated $C_2$ hydrocarbons and distilling the resultant mixture at a temperature and pressure sufficient to produce a distillate of high purity carbon tetrachloride and a bottoms containing substantially all chlorinated aliphatic, saturated $C_2$ hydrocarbons.

3. A method of recovering high purity chloroform and high purity carbon tetrachloride from mixtures of chloroform and carbon tetrachloride containing less than 5 percent by weight contaminating quantities of chlorinated $C_2$ aliphatic saturated and unsaturated hydrocarbons comprising photochlorinating said mixture to convert the chlorinated aliphatic unsaturated $C_2$ hydrocarbons to chlorinated aliphatic saturated $C_2$ hydrocarbons, distilling the resultant mixture at a temperature and pressure sufficient to provide a chloroform overhead and a carbon tetrachloride bottoms containing the chlorinated aliphatic saturated $C_2$ hydrocarbons, photochlorinating said carbon tetrachloride bottoms to convert all low boiling, chlorinated, aliphatic, saturated, $C_2$ hydrocarbons to higher chlorinated, aliphatic, saturated, $C_2$ hydrocarbons, distilling the resulting mixture at a temperature and pressure sufficient to provide an overhead of substantially pure carbon tetrachloride and a bottoms containing high boiling, chlorinated, aliphatic, saturated, $C_2$ hydrocarbons.

4. The method of providing high purity carbon tetrachloride and chloroform from a mixture of carbon tetrachloride and chloroform containing as impurities therein contaminating quantities of 1,2-dichloroethylene, trichloroethylene, and 1,2-dichloroethane, said impurities representing less than 5 percent by weight of the mixture comprising photochlorinating said mixture to convert said contaminating impurities to higher boiling chlorinated hydrocarbons and distilling the resulting mixture to provide a high purity chloroform overhead and a carbon tetrachloride bottoms containing higher boiling chlorinated hydrocarbons, subjecting the carbon tetrachloride impurities containing bottoms to a subsequent distillation to provide a carbon tetrachloride overhead substantially free of contaminating impurities and a bottoms containing said higher chlorinated hydrocarbons.

References Cited in the file of this patent

UNITED STATES PATENTS

| 875,232 | Acker | Dec. 31, 1907 |
| 1,231,123 | Brooks et al. | June 26, 1917 |
| 2,016,804 | Nichols | Oct. 8, 1935 |
| 2,183,046 | Reilly | Dec. 12, 1939 |

FOREIGN PATENTS

| 606,035 | Great Britain | Aug. 5, 1948 |

OTHER REFERENCES

B.I.O.S., Final Report No. 851, item No. 22, pp. 1–12, 2 pp. dwg. (pp. 7 and 8 particularly relied upon), April 1948.

Migrdichian: "Organic Synthesis," vol. II, Reinhold Publishing Co., New York, N.Y. (1957), p. 856 relied on.

Leermakers et al.: J. Am. Chem. Soc., 54, 4648–57 (1932).